Aug. 22, 1933.  W. E. SCHWANHAUSSER  1,923,398
DISPLAY DEVICE
Filed April 18, 1932
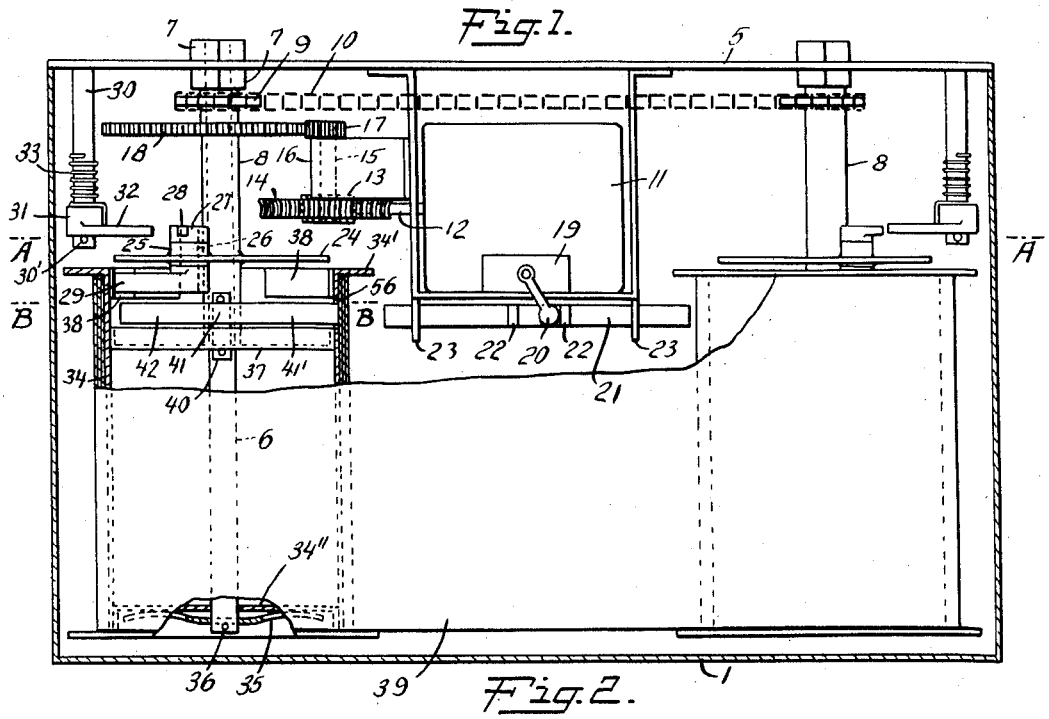
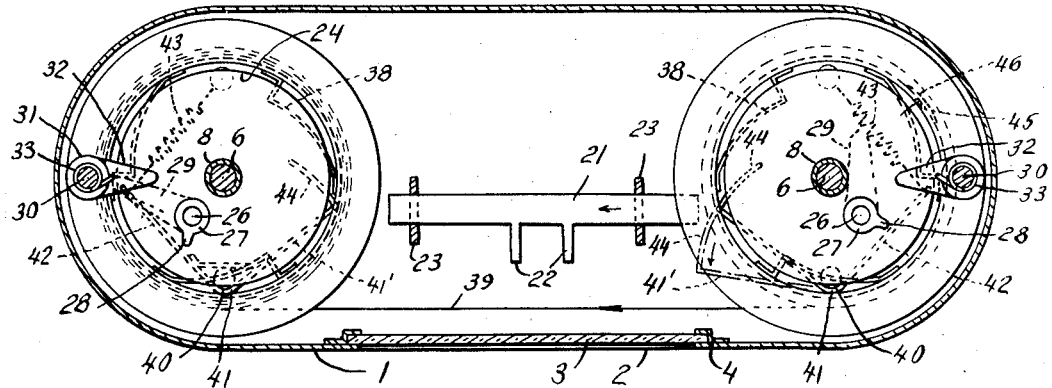
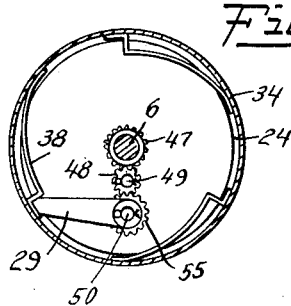
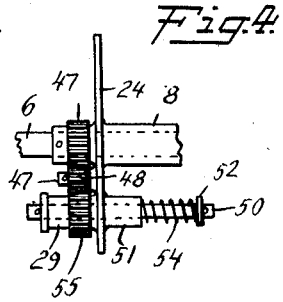
INVENTOR
Walter E. Schwanhausser
BY
Henry Pier Ball
ATTORNEY Patented Aug. 22, 1933

1,923,398

UNITED STATES PATENT OFFICE 1,923,398

DISPLAY DEVICE

Walter E. Schwanhausser, Maplewood, N. J.

Application April 18, 1932. Serial No. 606,017

19 Claims. (Cl. 40—53)

This invention relates to display devices or advertising machines wherein a panorama of reading matter or pictures on a movable strip is brought into view and relates more specifically to devices of this kind especially designed for use in taxi cabs and other installations where the space available is restricted.

One feature of the invention lies in the means used to make the device automatic so that when the strip has passed entirely through the machine from one spool onto another it is reversed in direction and the display is therefore made continuous.

Another feature consists in the novel way of disconnecting the spool, having the strip wound upon it, from the driving mechanism so the strip can be unwound therefrom at any speed.

Another feature is the driving mechanism which is common for both spools and the means for selecting which spool is to be driven thereby.

Another feature of the machine lies in a novel method of reversing the motor by means of an arm pivoted to the spool and which is held in position by the windings of the strip on the spool in such a way that when the strip is entirely unwound from the spool the arm is permitted to move radially outward from the spool and engage the motor reversing mechanism.

Additional novel features will be brought out in the following description.

Referring to the drawing, Figure 1 shows a front view of the device, partly in section. Figure 2 shows a top view of Figure 1 through section AA. Figure 3 shows a sectional view of one of the spools in modified form through section BB. Figure 4 shows a side view of Figure 3.

The advertising device is entirely enclosed in casing, 1, having an opening in the front thereof, 2, at the rear of which is suitably mounted a transparent sheet of material, 3, such as glass or celluloid, etc. secured to the casing, 1, by a suitable frame, 4. The top, 5, of casing, 1, constitutes a support upon which the inner mechanism of the device is secured and supported. Near each end of the casing, 1, is mounted a stationary shaft, 6, secured to the top, 5, of the casing in any suitable way such as by nuts, 7. Mounted upon this shaft, 6, is provided a sleeve, 8, free to rotate thereon. The sleeve supports a pinion, 9, secured thereto with which there is engaged a chain, 10, connecting the pinion, 9, of one shaft to that of the other at the opposite end of the casing, and forms a means whereby the two sleeves, 8, are at all times simultaneously operated. At the center of the casing, 1, and between the shafts, 6, is located a motor, 11, having a shaft, 12, provided with a worm, 13, engaged with a worm wheel, 14, mounted upon a shaft, 15, and having a bearing support, 16. The opposite end of the shaft, 15, is provided with a small pinion, 17, meshed with a large pinion, 18, the latter being secured to said sleeve, 8. It is obvious that as the motor, 11, rotates, the sleeve, 8, is simultaneously rotated therewith but with a very much reduced speed. Mounted in front of the motor is provided an electric switch, 19, having a controlling arm, 20. A bar, 21, is provided with spaced extensions, 22, between which the arm, 20, is mounted in such a way that as the bar, 21, is longitudinally moved on its bearings, 23, the arm, 20, will be shifted from position shown in Figure 1 to a corresponding opposite position, whereby the switch, 19, is caused to reverse the direction of rotation of the motor, 11, and thereby reverse the rotation of sleeves, 8.

Each sleeve, 8, is provided with a flange, 24, having an eccentric bearing, 25, A shaft, 26, is mounted in said bearing, 25, and has at its upper end a member, 27, having at one side a projection finger, 28. The lower end of the shaft, 26, is provided with an arm, 29, free to be moved alternately into the positions shown in Figure 2, wherein the arm, 29, in the left hand part of the figure, is shown moved outwardly away from the shaft, 6, whereas in the right hand part the arm, 29, has been moved inwardly toward the shaft, 6.

Mounted upon the top, 5, near each end of the device is provided a stud, 30, having movably mounted thereon, at its lower end, a member, 31, having a finger, 32, extending radially toward the shaft, 6. A suitable spring, 33, resiliently maintains the position of finger, 32, in the position shown. A cotter pin, 30', or other suitable means, secures the member, 31, in its vertical position on the stud, 30. Rotatably mounted near each end of the device is a spool upon which the advertising strip, 39, is wound, the spools are supported upon the shafts, 6. Each spool is formed by a cylinder, 34, having at its upper end an outwardly extending flange, 34', and at its lower end an internal flange, 34'', and another internal flange, 37, at its upper end. The flanges, 34'' and 37, are provided at their centers with openings through which the shafts, 6, pass to support the spools. A spring washer, 35, is mounted on each shaft, 6, and resiliently presses the spool upward, a pin, 36, is provided at the end of the shaft, 6, to maintain the spool in position on the shaft, 6. The openings in the centers of the flanges, 34" and 37, constitute bearings upon which the spools rotate on the shafts, 6. On the inside of cylinder, 34, above flange, 37, are circumferentially mounted several ratchet projections, 38, formed of a strip of suitable material bent in the shape shown in Figure 2, the ends of which are secured to the inside of the cylinder, 34, by spot welding or by any other suitable means. The ratchets, 38, are assembled in the path of the arm, 29, as shown in Figure 1, and in the position shown in the left hand side of Figure 2 the arm, 29, is in engagement with one of the ratchets, 38, so that in this position the arm, 29, is driving the left hand spool, and also the right hand sleeve by means of the chain, 10, in a clockwise direction, and causing the strip, 39, to travel from the right hand spool to the left hand spool. During this time the position of arm, 29, on the right hand spool has been released from its ratchets, 38, and permits the right hand spool to be rotated by the strip, 39, as it is being unwound from it, the arm, 29, in this position being adjusted against the sleeve, 8.

How the position of the arm, 29, is automatically determined by the direction of rotation of the spool will now be described.

It is readily seen that as the spool rotates the projection finger, 28, on arm, 29, engages one side or the other of finger, 32, depending upon its direction of rotation. Referring to Figure 2, it is readily seen that if the sleeve, 8, is rotated in a clockwise direction the arm, 29, will be moved into the position shown on the left hand side of Figure 2, by the finger, 28, engaging the finger, 32, and rotating the shaft, 26, to which arm, 29, is secured; whereas if the sleeve, 8, is moved in a counter clockwise direction of rotation the finger, 28, will engage the finger, 32, on the opposite side and the arm, 29, will be moved to the position shown on the right hand side of Figure 2.

It is readily seen that as the strip, 39, is wound from one spool to the other the relative diameters of the outside windings determine the speed of rotation of the driven spool, rotated by the pull of the strip, 39. The spool when it is driven is, of course, disconnected entirely from the motor drive and is free to rotate at all speeds. The speed of the driven spool becomes greater than that of the driving spool when more of the strip, 39, is wound on the driving spool than on the driven spool and this necessitates the arm, 29, to be automatically adjusted in its ineffective position shown in the right spool in Figure 2. If this were not done and the arm, 29, left in the position shown in the left hand spool, the ratchets, 38, would be driven hard against the end of the arm, 29, and the device would be stalled or the strip, 39, broken.

The method whereby the motor is reversed by the strip, 39, will now be described. On the internal flange, 37, is mounted an upwardly projecting stud, 40, upon which is mounted a bell crank arm, 41, having a member, 42, engaged by a spring, 43, to resiliently secure it in the position shown on the left hand side of the Figure 2 when the strip, 39, is wound on the spool. The bell crank, 41, has another member, 41', provided with an inwardly extending terminal, 44, shown in Figure 2. In the position shown on the left hand side of the Figure 2 the terminal, 44, bears against the inner side of the first layer of the strip, 39, on the cylinder, 34. It is obvious that, as the strip, 39, is entirely unwound from the spool, the bell crank, 41, will be moved by the spring, 43, to extend the member, 43', and terminal, 44, outwardly beyond the outer surface of the cylinder, 34, as shown in position of parts on the right hand side of Figure 2. A suitable opening is made in the side of the cylinder, 34, to permit this motion of the arm, 43, and the terminal, 44. In the position shown in Figure 2, the strip, 39, has been unwound from the right hand spool onto the left hand spool and the bell crank, 41, has been moved into the position shown in Figure 2 whereby the terminal, 44, will engage the right hand end of the reciprocable bar, 21, to move it longitudinally to the left and thereby reverse the direction of the motor.

The end of the strip, 39, passes through a slot, 45, in the cylinder, 34, as shown in Figure 2, and a sticker or small strip of paper or other material, 46, may be glued across the face of the slot, 45, to secure the strip, 39, in position on the spool. Upon the reversal of the motor, 11, through the longitudinal movement of the bar, 21, the right hand spool in Figure 2 becomes the driver and the left hand spool becomes the driven spool and is entirely disconnected from the driving system as already explained. This reversal of rotation of the spools causes the strip, 39, to pass from the left hand spool to the right hand spool and as it does so the strip, 39, presses the member, 41', of the bell crank, 41, back through the opening, 56, within the contour of the cylinder, 34, so that the right hand spool may now freely rotate without engaging the bar, 21. Upon the reversal of the motor, 11, the right hand sleeve, 8, has its direction of rotation reversed so that the arm, 29, which up to this time occupied the position shown on the right hand side of Figure 2 is moved automatically by means of the projection, 28, coming in contact with finger, 32, whereby the outer end of the arm, 29, is brought into engagement with one or another of the ratchets, 38, thereby causing the spool to be driven by the sleeve, 8.

In some instances it is preferable to do away with the stud, 30, and the parts supported thereby and use the method shown in Figures 4 and 5 for reversing the position of the arm, 29. In this case the stationary shaft, 6, has secured thereto a pinion, 47, not free to rotate. Engaged with pinion, 47, is a second pinion, 48, suitably supported on a shaft, 49, mounted in the flange, 24. Meshed with the second pinion, 48, is a third pinion, 55, against the side of which bears the arm, 29, so that the position of the arm, 29, is frictionally determined by the direction of the rotation of pinion, 49. The arm, 29, is rotatably supported upon a shaft, 50, having a bearing, 51, in the disc, 24. On the lower end of the shaft, 50, is mounted a collar, 52, to retain the parts in position on the shaft. Between the collar, 52, and the surface of the bearing, 51, is mounted a spring, 54 to bring the surfaces of the pinion, 55, and the arm, 29, into frictional relation. It is obvious that as the direction of rotation of the sleeve, 8, is reversed the arm, 29, will be caused to occupy the position shown either on the left or right hand side of Figure 2 according to the direction of the rotation of sleeve, 8.

It is obvious to anyone skilled in the art to which this invention pertains that many modifications of this invention may be made without departing from the spirit or scope of the same, and having described one form of the invention according to the statutes, what I claim and wish to be protected by Letters Patent is—

1. In a display device a strip having matter to be displayed, spools to support and actuate the strip and driving means therefor in combination with stationary spindles to support said spools rotatable sleeves on the spindles rotated by the driving means, clutches between the spools and sleeves and means responsive to the movements of the strip to adjust the clutches in effective and ineffective positions.

2. In a display device, a support, a spool rotatably supported near each end thereof, a strip wound on both spools, a driving device for the spools, a rotatable ratchet member carried by each spool between each spool and the driving device, an arm continuously driven by said driving device to normally engage said member, and means under control of the direction of travel of said strip to adjust said arm in effective and ineffective positions with reference to said member.

3. In a display device a support, a spool at each end thereof, a strip wound on both spools, a driver for both spools, each spool including a drum upon which the strip is wound, a stationary spindle held by said support upon which the spool is supported, a sleeve on the spindle rotated by the driver, a clutch between the drum and the sleeve, and means responsive to the direction of rotation of the sleeve to control said clutch, to connect and disconnect the drum from the sleeve.

4. A device for displaying advertisements and the like, having a casing, a window in the same, a pair of spools, a pair of stationary supports for the spools within said casing, a reversible driving means for the spools, including rotatable members on said supports for the spools, means for driving said members, an adjustable clutch between each spool and its rotatable member, a device for each spool to control each clutch and a strip, wound on the spools and moving therewith to display matter thereon through said window, effective through its movement to adjust each clutch controlling device into operative and inoperative positions.

5. A device for displaying advertisements and the like including a casing having a window in the side thereof, a pair of spaced spools rotatably supported within said casing, a pair of reversible driving supports for said spools, a motor to rotate said spool supports, gearing connecting the motor to the spool supports, means including clutches between the spools and driving supports effective to connect the spools alternately to their respective supports, and a display strip, actuated by said spools in juxtaposition with said window, effective to adjust said clutch into operative and inoperative positions and control the driving supports.

6. A display device having a containing casing in combination with a display strip, a pair of strip supporting spools rotatable supports to detachably support the spools, driving means for the spool supports, and strip, automatic reversing means to rotate both spool supports simultaneously and means under control of the strip effective to detach alternately each spool from its support and control said reversing means.

7. In a display device the combination of a containing casing, a strip to travel therein and a motor to actuate the strip, with a pair of spools to support said strip, a pair of driving members for said spools supporting the same and rotatable independently thereof, responsive to said motor, automatic reversing means for said motor to alternately connect each spool with its respective support and means under the control of the strip effective to control said reversing means to determine which spool is to be driven by its support.

8. In a display device the combination of a casing, a strip, having matter to be displayed mounted on spools, a window in said casing through which said matter may be viewed and a reversible motor for driving said strip, with gearing between the motor and the spools, a settable clutch mounted on each spool between the gearing and the spool effective to drive the same means carried by the spools responsive to the movement of the strip effective to select and set the clutch to drive the spools and means to control said motor responsive to said movement.

9. In a display device the combination of a casing, a strip having matter to be displayed mounted on spools, a window in said casing through which said matter may be viewed and a motor for driving said strip, reversing means to control the direction of said motor gearing between the motor and spools, a clutch carried by each spool between the gearing and each spool, effective to drive the spool means carried by the spools responsive to the direction of travel of said strip for adjusting the clutches alternately into effective and ineffective positions and means to control said motor reversing means responsive to said direction of travel of the strip.

10. In a display device a traveling strip having matter to be displayed, selectable driving rotatable supports including a spool to drive the strip, an automatic reversible driving device to actuate said supports permanently connected thereto and common to both supports means mounted within said spool responsive to the ends of the strip effective to determine the direction of rotation of said supports and means to select the support to drive the strip.

11. In a display device, a traveling strip having matter to be displayed, spools to support and actuate the strip, a motor for driving said spools, an adjustable clutch mechanism carried by each spool to connect the same with the motor including means mounted in each spool to adjust the clutch mechanism in effective and ineffective positions, responsive to the direction of travel of the strip and means to simultaneously reverse the direction of rotation of the motor when the strip has ended its travel.

12. In a display device, a traveling strip, spools to support and actuate the same, a support for each spool, a clutch between each spool and its support, a reversible motor for driving said spools, each spool having an arm mounted therein to control said motor, resilient means normally holding said arm outside the contour of the spool, the strip, effective when wound on the spool, to hold said arm within said spool and means engaged by the arm, when the latter is outside the spool, at the end of travel of the strip, to reverse the direction of rotation of the motor and simultaneously control the effectiveness of said clutches.

13. In a display device a traveling strip, spools to hold and actuate the same, disconnectible driving supports for said spools, a driver for the supports, a reversing mechanism for the driver, means associated with each spool effective to adjust said mechanism at the end of travel of said strip to determine the direction of travel of the same and simultaneously control the effectiveness of said supports to drive the spools.

14. In a display device a traveling strip, spools to support and actuate the same, a driver for the spools, a clutching means for connecting and disconnecting the driver from the spools, a direction of rotation reversing mechanism for the driver, an arm pivoted to each spool having outer and inner positions with reference thereto, effective in its outer position to engage said mechanism at the end of travel of said strip to determine the direction of its rotation and control said clutching means.

15. In a display device the combination of a display strip mounted on spools, rotatable drivers for the spools and a reversible driving means to rotate the spools in either direction, with clutch members between the spools and drivers including a ratchet member on the spool and a vibratable arm, to engage therewith, pivoted on said driver, and means responsive to the direction of rotation of the driver to vibrate said arm into effective and ineffective positions with respect to said ratchet member, to control said drivers.

16. In a display device the combination of a display strip mounted on spools, rotatable drivers for the spools and a reversible driving means to rotate the spools in either direction, with clutch members between the spools and drivers including a ratchet member on the spool and a vibratable arm, to engage therewith, pivoted on said driver, and gearing between the arm and driver to vibrate said arm into effective and ineffective positions, with respect to said ratchet member, to control said drivers.

17. In a display device the combination of a display strip mounted on spools, rotatable drivers for the spools and a reversible driving means to rotate the spools in either direction, with clutch members between the spools and drivers including a ratchet member on the spool and a vibratable arm, to engage therewith, pivoted on and held by frictional contact with said driver, and gearing between the arm and driver to vibrate said arm into effective and ineffective positions, with respect to said ratchet member, to control said drivers.

18. In a display device the combination of a display strip mounted on spools and reversible driving means to rotate the spools, with clutch members between the spools and said driving means and means including a stationary member, responsive to the direction of rotation of the driving device to adjust said clutch members into effective and ineffective positions.

19. In a display device the combination of a display strip mounted on spools, and reversible rotatable drivers for the spools, with clutch members, including a ratchet member and a vibratable arm to engage therewith, between the spools and drivers and means responsive to the direction of rotation of the drivers to vibrate said arm into effective and ineffective positions with respect to said ratchet member, to control said drivers.

WALTER E. SCHWANHAUSSER.